US005444633A

United States Patent [19]

Coenen et al.

[11] Patent Number: 5,444,633

[45] Date of Patent: Aug. 22, 1995

[54] METHOD AND APPARATUS FOR DETECTING THE POSITION OF A CARRIER THAT CARRIES A TEXTILE BOBBIN

[75] Inventors: Norbert Coenen; Ulrich Wirtz, both of Mönchengladbach; Ferdinand-Josef Hermanns, Erkelenz; Jürgen Breuer, Viersen, all of Germany

[73] Assignee: W. Schlafhorst AG & Co., Moenchengladbach, Germany

[21] Appl. No.: 204,537

[22] Filed: Mar. 2, 1994

[30] Foreign Application Priority Data

Mar. 2, 1993 [DE] Germany ........................ 43 06 378.0

[51] Int. Cl.$^6$ ............................................ G05B 19/18

[52] U.S. Cl. ........................................ 364/470; 57/264

[58] Field of Search ................ 364/470; 112/279, 278, 112/273; 340/870.31, 870.36; 57/264, 281, 270; 324/207.11-207.26

[56] References Cited

U.S. PATENT DOCUMENTS

| | | | |
|---|---|---|---|
| 4,250,825 | 2/1981 | Kamiyama | 112/278 |
| 4,556,886 | 12/1985 | Shimizu et al. | 340/870.32 |
| 4,825,789 | 5/1989 | Garron et al. | 112/278 |
| 4,875,009 | 10/1989 | Leveque | 324/207.13 |
| 5,107,667 | 4/1992 | Tone et al. | 57/264 |
| 5,210,490 | 5/1993 | Munch et al. | 324/207.17 |

FOREIGN PATENT DOCUMENTS

| | | |
|---|---|---|
| 3029543 | 8/1982 | Germany . |
| 2949075 | 10/1982 | Germany . |
| 3313418 | 10/1984 | Germany . |
| 3628045 | 3/1987 | Germany . |
| 2854199 | 7/1987 | Germany . |
| 3447560 | 8/1988 | Germany . |
| 3732367 | 11/1988 | Germany . |
| 3603002 | 3/1990 | Germany . |
| 3841464 | 6/1990 | Germany . |
| 3912030 | 10/1990 | Germany . |
| 4023795 | 2/1991 | Germany . |
| 4038970 | 6/1992 | Germany . |
| 4041713 | 6/1992 | Germany . |
| 4110626 | 10/1992 | Germany . |
| 4217059 | 11/1992 | Germany . |

*Primary Examiner*—James P. Trammell

*Attorney, Agent, or Firm*—Herbert L. Lerner; Laurence A. Greenberg

[57] ABSTRACT

An automatic textile machine includes a multiplicity of work stations each having its own work station electronics for controlling progress of work done at the work station. A method for detecting a position of a cop carrier carrying a textile cop in the vicinity of a work station includes evaluating mistuning of an oscillator circuit as information with a secondary coil disposed on the cop carrier; detecting the information transmitted by the cop carrier with a sensor device; carrying the information to the work station electronics; and processing the information with the work station electronics to initiate further operations. An apparatus for detecting the position of a cop carrier carrying a textile cop in the vicinity of one of the work stations includes a secondary coil disposed on the cop carrier, and a sensor disposed in the vicinity the winding station. The sensor is connected to the winding station electronics and detects information transmitted by the cop carrier. The sensor has an oscillator circuit to be mistuned by the secondary coil.

23 Claims, 2 Drawing Sheets

METHOD AND APPARATUS FOR DETECTING THE POSITION OF A CARRIER THAT CARRIES A TEXTILE BOBBIN

BACKGROUND OF THE INVENTION

1. Field of the Invention

The invention relates to a method and an apparatus for detecting the position of a carrier that carries a textile bobbin or cop, in the region of a work station of an automatic textile machine that has a number of work stations, wherein each work station has its own work station electronics which control the progress of work done at that work station.

In automatic textile machines, such as twisting machines, bobbin winders, etc., it is known for each work station to have its own work station electronics, which control or monitor all of the operations carried out at the applicable work station.

In order to control and monitor transport operations, such as the delivery of bobbins disposed on carriers, a common control unit belonging to the machine itself is provided. Such devices, which are described, for instance, in German Patent DE 36 03 002 C, have a number of sensor devices disposed in the region of a bobbin transport path, which are all connected to the central control unit. On one hand, such a structure requires a relatively powerful and therefore expensive computer, and on the other hand, the expense for connecting the sensor devices to the central control unit in such a way that they function properly is not inconsiderable.

In a combined spinning and bobbin winding machine, it is also known for the cops made in a spinning machine to be placed on cop carriers and delivered to the bobbin winder over a transport system equipped with revolving conveyor belts. Within the bobbin winder, the cop carriers are then distributed to the various winding stations successively through shunts or the like equipped with sensor devices, and the cops are rewound onto cross-wound bobbins or cheeses. For the sake of problem-free operation at the winding stations, it is desirable for at least one reserve cop to be kept in a waiting position at the individual winding stations at all times.

An initiator for actuating the cop carrier, which is connected to the central control unit of the spinning machine and is located in the region of the waiting position, prevents the yarn joining device from making unnecessary attempts at piecing up the yarn if the reserve cop is absent.

It is also known, in a combination of a plurality of spinning and bobbin winding machines, to process different batches of yarn. The various yarn batches are, for instance, identified by codes on the tubes or cop carriers, as is described in German Published, Non-Prosecuted Application DE 37 32 367 A1.

German Published, Non-Prosecuted Application DE 40 38 970 A1 relates to a similar configuration. Electronically eraseable read/write memories in the form of chips for storing the applicable yarn data are disposed on the tubes or cop carriers, and through the use of special read/write devices, which have a serial oscillating circuit, the memory chips are variably encodable, so that all of the necessary yarn data can be read by reading devices disposed downstream. The transmitting and receiving devices of such coding and decoding devices are likewise connected to the control unit belonging to the machine itself.

German Published, Non-Prosecuted Application DE 42 31 059 A1, relates to an apparatus in which a chip that has an electronic circuit with integrated frequency dividers is disposed on the cop carriers or tubes. The division ratio of these frequency dividers is specified to be different from batch to batch.

Through the use of a transceiver that broadcasts or transmits an electromagnetic oscillation at a fixed frequency, reliable recognition of the various batches is possible, because the oscillations received by feedback from the cop carriers or tubes differ markedly in their modulation frequency from the fed-back oscillations of other batches. In that transceiver as well, generating the oscillation of the carrier frequency is performed through a serial oscillating circuit, which is powered by a frequency generator through a driver. Evaluation of the received signals is carried out through the central machine computer.

SUMMARY OF THE INVENTION

It is accordingly an object of the invention to provide a method and an apparatus for detecting the position of a carrier that carries a textile bobbin. The main object is to provide a simplified method and apparatus for controlling the transport of the carriers of textile bobbins that in particular detect a presence of a carrier in the region of a waiting position of a work station of a textile machine.

With the foregoing and other objects in view there is provided, in accordance with the invention, in a method for detecting a position of a cop carrier carrying a textile cop in the vicinity of a work station of an automatic textile machine including a multiplicity of work stations each having its own work station electronics for controlling progress of work done at the work station, the improvement which comprises evaluating mistuning of an oscillator circuit as information with damping means disposed on the cop carrier; detecting the information transmitted or broadcast actively or passively by the cop carrier with a sensor device; carrying the information to the work station electronics; and processing the information with the work station electronics to initiate corresponding transport and textile bobbin changing circuits.

The invention is especially advantageously applicable to automatic bobbin winders. This will therefore be the example of use that is explained below for the exemplary embodiment.

This kind of method and this kind of apparatus for carrying out the method offer the advantage of relieving the control unit belonging to the machine itself of transport and cop changing circuits that are directly involved with the unwinding process. Since the winding station electronics, which previously were active only during the actual winding process, then take on part of the task of cop transport monitoring, the central machine computer thus becomes able to take on additional tasks. When there is a large number of bobbin winders (machines with spinning station identification and machines with multiple batch detection), devices are moreover already present that when modified slightly can be used for the new task as well.

In accordance with another mode of the invention, the detection of the position of a cop carrier that is carrying a cop is performed by detecting the information broadcast or transmitted actively by a memory chip.

In accordance with a further mode of the invention, the actively broadcast or transmitted information which, for instance, contains data about yarn properties and/or production data, is detected by sensor devices, for example read/write devices of a spinning station identification system or transceivers of a multiple batch detection system, and converted in the winding station electronics into a corresponding signal for a transport and cop changing circuit.

Using existing devices for detecting the position of a cop carrier also has the advantage of making it possible to dispense with the relatively expensive initiator that was previously located in the region of the waiting position of the winding station.

In accordance with an added mode of the invention, the sensor devices have a serial oscillating circuit with an HF coil that is powered continuously with a carrier frequency. Such sensor devices are also suitable for detecting information broadcast passively by the cop carriers.

With the objects of the invention in view, there is also provided, in an automatic textile machine including a multiplicity of work stations each having its own work station electronics for controlling progress of work done at the work station, an apparatus for detecting a position of a cop carrier carrying a textile cop in the vicinity of one of the work stations, comprising damping means disposed on the cop carrier, and a sensor device being disposed in the vicinity the winding station, being connected to the winding station electronics and having means for detecting information transmitted or broadcast actively or passively by the cop carrier, the sensor device having or being an oscillator circuit to be mistuned by the damping means.

In accordance with another feature of the invention, the cop carriers have ringlike elements of electrically conductive material. These elements act as secondary coils and upon entering the operating range of the HF coil disposed in the serial oscillating circuit, cause a voltage change in the oscillating circuit that, once converted into a useful signal, is processed directly by the winding station electronics.

In accordance with a further feature of the invention, the serial oscillating circuit has a reference oscillating circuit with suitable rectification added onto it, and both oscillating circuits are connected to a comparator. The voltage difference arising between the oscillating circuits upon damping of the HF coil is converted by the comparator into a signal that is usable by the winding station electronics.

In accordance with an added feature of the invention, the reference oscillating circuit is disposed in readily accessible form on a printed wiring board. The reference oscillating circuit has the advantage, among others, of maximally compensating for the temperature drift of the oscillating circuits, for instance.

In accordance with an additional feature of the invention, the serial oscillating circuit has a capacitor as well as the dampable HF coil and is powered by a frequency generator through an HF driver. A damping resistor is also incorporated between the driver and the HF coil.

In accordance with a concomitant feature of the invention, an input to the reference oscillating circuit is located between the damping resistor and the HF coil. This kind of embodiment has the advantage of ensuring that the voltage difference between the oscillating circuits is amplified and attains a value that can be unequivocally recognized by the comparator and converted into a useful signal for the winding station electronics.

Other features which are considered as characteristic for the invention are set forth in the appended claims.

Although the invention is illustrated and described herein as embodied in a method and an apparatus for detecting the position of a carrier that carries a textile bobbin, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
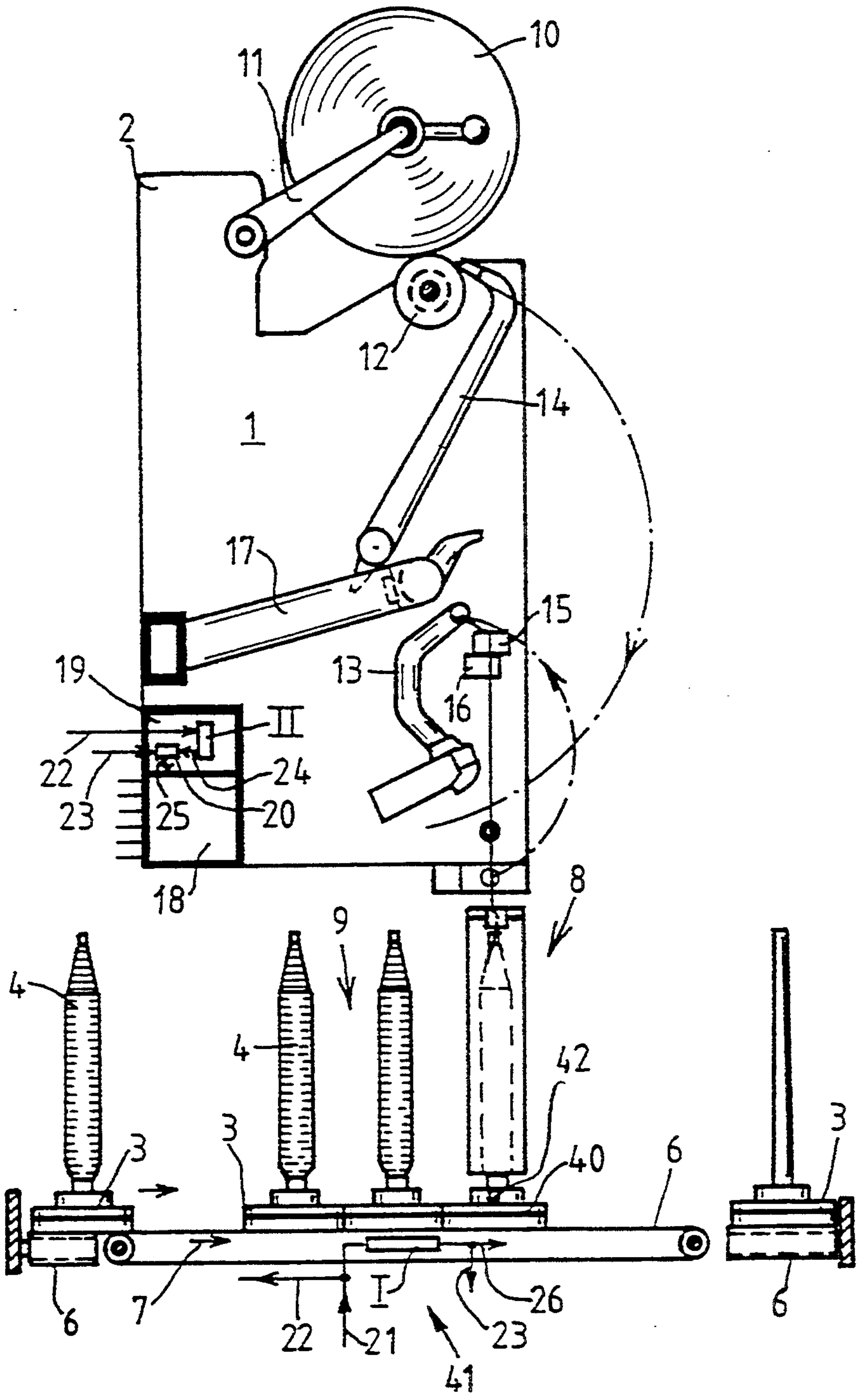
FIG. 1 is a diagrammatic, elevational view of a winding station of a bobbin winder, having a sensor device being located in a region of a waiting position of the winding station and being connected directly to winding station electronics.

Referring now to the figures of the drawing in detail and first, particularly, to FIG. 1 thereof, there is seen a winding station 1 of a bobbin winder which is known per se.

A cross-wound bobbin or cheese winding device, of which only a creel 11, a cheese 10 and a yarn guide drum 12 are shown, is disposed as usual on a winding station frame 2. Such winding stations also have yarn joining devices, with essential components that are a lower yarn deliverer 13, an upper yarn deliverer 14, a yarn cleaner 15, a splicer 16 and a yarn suction removal device 17. Such winding stations also each have their own winding station electronics 18.

Figure 2:
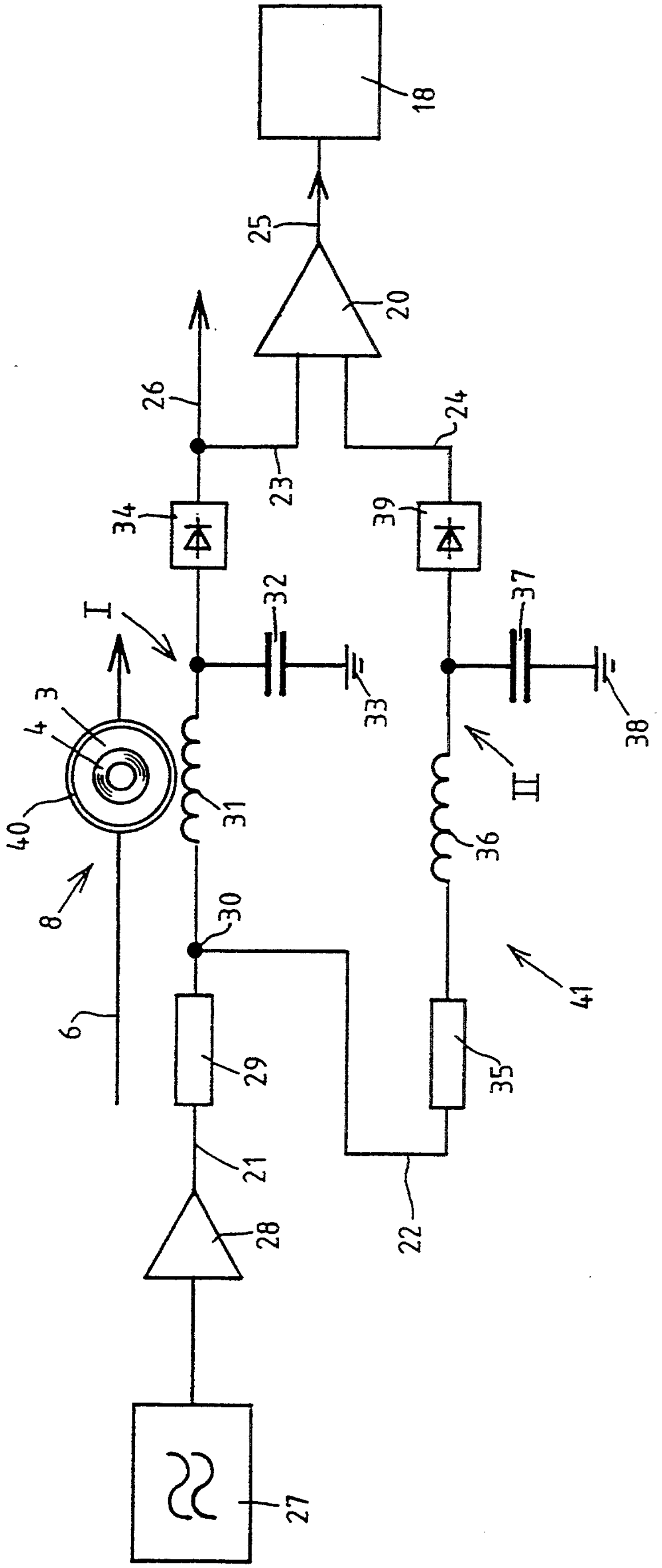
FIG. 2 is a schematic and block circuit diagram of an exemplary embodiment of a sensor device for detecting the position of cop carriers.

The cops 4, which are made on a non-illustrated spinning machine and set down on cop carriers 3, are brought on conveyor belts 6, moving in a direction indicated by reference numeral 7, to the region of the winding stations 1, where they are rewound in an unwinding position 8 to make the cheeses 10. As a rule, in order to assure problem-free rewinding, several cops 4 are located in a reserve position, as is shown in FIG. 1. In order to prevent the yarn joining device from starting fruitless yarn joining attempts despite the absence of reserve cops, a sensor device 41 which is disposed in the region of a waiting position 9 checks for the presence of cop carriers 3 in the waiting position 9. This sensor device 41, which is shown in FIG. 2, has a serial oscillating circuit I, which is powered by a frequency generator 27 through an HF drive 28. The serial oscillating circuit I has an HF coil 31 that can be varied by secondary coils 40 on the cop carriers 3 and also has a capacitor 32 connected to a ground point 33. Memory chips 42 may also be disposed on the cop carriers 3. The sensor device 41 may be a read/write device or a transceiver for detecting information transmitted actively by the memory chips. In this way, in an automatic bobbin winder, signals transmitted by memory chips are evaluated with the winding station electronics 18 as active information. The information contained on the memory chips may relate to yarn properties and/or production data, such as information concerning a production site of the cops. A damping resistor 29 is also incorporated in a line 21 between the HF driver 28 and the induction coil 31. The oscillating circuit I is connected to a comparator 20 through a rectifier 34 and a line 23. Through a line 26, the oscillating circuit I is also either integrated into a reading and writing part of a spinning station identification system as is described in German Published, Non-Prosecuted Application DE 40 38 970 A1, or it is integrated into a transceiver portion of a multiple batch detection system as is described in German Published, Non-Prosecuted Application DE 42 31 059 A1. A reference oscillating circuit II that is tuned to the oscillating circuit I is fed-in at an input point 30 between the damping resistor 29 and the HF coil 31. The circuit II has a resistor 35 which is connected through a line 22 to the input point 30 and through a coil 36 and a capacitor 37 to a ground point 38. The coil 36 of this circuit II is likewise connected through a rectifier 39 and a line 24 to the comparator 20.

This reference oscillating circuit II, which is preferably readily accessibly located on a printed wiring board 19 shown in FIG. 1, on one hand assures that the temperature drift of the serial oscillating circuit I, for instance, will be compensated for, and on the other hand in the event of influence on the HF coil 31 of the serial oscillating circuit I by the secondary coils 40 disposed on the cop carriers 3, it assures an increase in the voltage differences between the oscillating circuits I and II that can be detected by the comparator 20 and converted into a useful signal.

The secondary coil 40 is preferably constructed as an electrically conductive ring surrounding the base of the cop carrier. Upon the arrival of a secondary coil 40 into the operative range of the HF coil 31, for instance by means of a cop carrier 3 arriving at the waiting position 9, a (loose) coupling-in of a short-circuit winding into the oscillating circuit I takes place. This causes mistuning of the resonant circuit at higher frequencies, which leads to a shift in the inductance of the HF coil 31 to lower values. The current flowing in the secondary coil 40 causes an additional damping of the oscillating circuit. The shift in resonant frequency and the damping lead to a change in voltage in the oscillating circuit, which correspondingly has an effect on the direct voltage in the line 23.

Since the impedance of the serial oscillating circuit I increases as a result of the mistuning, the voltage drop at the damping resistor 29 becomes less. This leads to an increase in the supply voltage in the resonant circuit II and thus to an increase in the direct voltage in the line 24.

In this way, evaluatable differential voltages are supplied to the comparator 20, which passes them on in the form of a useful signal over a line 25 to the winding station electronics 18.

The method and the apparatus according to the invention show one possible way of using existing electronic devices of a bobbin winder for additional tasks and therefore further improving the effectiveness of such devices.

We claim:

1. In a method for detecting a position of a cop carrier carrying a textile cop in the vicinity of a work station of an automatic textile machine including a multiplicity of work stations each having its own work station electronics for controlling progress of work done at the work station, the improvement which comprises:

evaluating mistuning of an oscillator circuit as information with damping means disposed on the cop carrier;

detecting the information transmitted by the cop carrier with a sensor device;

carrying the information to the work station electronics; and processing the information with the work station electronics to initiate further transport and changing operations based on the processed information.

2. The method according to claim 1, which comprises evaluating and detecting the information as passive information.

3. The method according to claim 1, which comprises evaluating and detecting the information as active information.

4. The method according to claim 1, which comprises evaluating signals transmitted by memory chips disposed on the cop carriers with the winding station electronics as active information, in an automatic bobbin winder.

5. The method according to claim 4, which comprises relating the information contained on the memory chips to at least one of yarn properties and production data.

6. The method according to claim 4, which comprises relating the information contained on the memory chips to production data regarding a production site of the cops.

7. The method according to claim 1, which comprises continuously powering an HF coil of the serial oscillator circuit in the vicinity of a cop transport path with a carrier frequency, and indicating presence of a cop carrier with a voltage change in the serial oscillating circuit occurring at the HF coil when a secondary coil disposed on a cop carrier as the damping means is coupled-in.

8. The method according to claim 7, which comprises converting the voltage change occurring in the serial oscillating circuit upon coupling-in of the secondary coil at the HF coil into a useful signal being processed by the work station electronics.

9. The method according to claim 7, which comprises adding a reference oscillating circuit to the serial oscillating circuit, and converting a voltage difference between the oscillating circuits and occurring upon damping of the HF coil with a comparator into a signal being usable by the work station electronics.

10. In an automatic textile machine including a multiplicity of work stations each having its own work station electronics for controlling progress of work done at the work station, an apparatus for detecting a position of a cop carrier carrying a textile cop in the vicinity of one of the work stations, comprising:

damping means disposed on the cop carrier, and a sensor device being disposed in the vicinity the work station, being connected to the work station electronics and having means for detecting information transmitted by the cop carrier, said sensor device having an oscillator circuit to be mistuned by said damping means.

11. The apparatus according to claim 10, wherein said sensor device actively detects the information transmitted by the cop carrier.

12. The apparatus according to claim 10, wherein said sensor device passively detects the information transmitted by the cop carrier.

13. The apparatus according to claim 10, including memory chips disposed on the cop carriers, said sensor device being a read/write device for detecting information transmitted actively by said memory chips.

14. The apparatus according to claim 10, including memory chips disposed on the cop carriers, said sensor device being a transceiver for detecting information transmitted actively by said memory chips.

15. The apparatus according to claim 13, wherein said sensor device for detecting the information actively transmitted by said memory chips has a frequency generator for powering said serial oscillating circuit.

16. The apparatus according to claim 14, wherein said sensor device for detecting the information actively transmitted by said memory chips has a frequency generator for powering said serial oscillating circuit.

17. The apparatus according to claim 10, wherein said sensor device has an HF driver and a frequency generator for powering said oscillating circuit through said HF driver, and said oscillating circuit is a serial oscillating circuit having a capacitor and an HF coil being variable by said damping means in the form of a secondary coil.

18. The apparatus according to claim 17, wherein said secondary coil is a ring surrounding a base of the cop carrier.

19. The apparatus according to claim 18, wherein said ring is made from an electrically conductive material selected from the group consisting of copper, iron and aluminum.

20. The apparatus according to claim 17, including a reference oscillating circuit connected to said serial oscillating circuit, and a comparator connected to both of said oscillating circuits.

21. The apparatus according to claim 20, including a damping resistor connected upstream of said serial oscillating circuit, said reference oscillating circuit having an input point connected between said damping resistor and said HF coil.

22. The apparatus according to claim 20, including rectifiers for rectifying an alternating voltage present in said oscillating circuits, said comparator converting direct voltages being generated into a useful signal for the work station electronics.

23. The apparatus according to claim 20, including a printing wiring board on which said reference oscillating circuit is disposed in a readily accessible manner.

* * * * *